United States Patent
Viola et al.

(10) Patent No.: US 10,204,170 B2
(45) Date of Patent: Feb. 12, 2019

(54) NEWS FEED

(71) Applicant: Highspot, Inc., Seattle, WA (US)

(72) Inventors: Paul Viola, Seattle, WA (US); Oliver Sharp, Seattle, WA (US); David Wortendyke, Seattle, WA (US); Erik Christensen, Seattle, WA (US); Robert Wahbe, Seattle, WA (US); Nate Dire, Seattle, WA (US); Steven Millet, Edmonds, WA (US)

(73) Assignee: Highspot, Inc., Seattle, WA (US)

( * ) Notice: Subject to any disclaimer, the term of this patent is extended or adjusted under 35 U.S.C. 154(b) by 763 days.

(21) Appl. No.: 14/827,149

(22) Filed: Aug. 14, 2015

(65) Prior Publication Data

US 2016/0048764 A1 Feb. 18, 2016

Related U.S. Application Data

(60) Provisional application No. 62/037,956, filed on Aug. 15, 2014.

(51) Int. Cl.
 *G06F 17/30* (2006.01)

(52) U.S. Cl.
 CPC ...... *G06F 17/3089* (2013.01); *G06F 17/3071* (2013.01); *G06F 17/30702* (2013.01); *G06F 17/30867* (2013.01)

(58) Field of Classification Search
 CPC ........... G06F 17/3089; G06F 17/30702; G06F 17/3071; G06F 17/30867; G06F 17/3053; G06F 17/277; G06N 5/04; G06N 99/005
 USPC .......................................................... 706/11
 See application file for complete search history.

(56) References Cited

U.S. PATENT DOCUMENTS

| | | | |
|---|---|---|---|
| 7,814,425 B1 | 10/2010 | O'Shaugnessy et al. |
| 7,970,721 B2 | 6/2011 | Leskovec et al. |
| 8,014,634 B1 | 9/2011 | Chan |
| 8,402,375 B1 | 3/2013 | Skare et al. |
| 8,447,760 B1 | 5/2013 | Tong |
| 8,510,313 B2 | 8/2013 | Vaughan et al. |
| 8,554,601 B1 | 10/2013 | Marsh et al. |
| 8,872,804 B2 | 10/2014 | Cummings et al. |
| 2004/0267700 A1 | 12/2004 | Dumais et al. |
| 2005/0267799 A1 | 12/2005 | Chan et al. |
| 2006/0085427 A1 | 4/2006 | D'Urso |

(Continued)

FOREIGN PATENT DOCUMENTS

JP 2012185780 B1 9/2012

OTHER PUBLICATIONS

International Search Report and Written Opinion for International Application No. PCT/US2013/076962, dated Apr. 22, 2014, 11 pages.

(Continued)

*Primary Examiner* — Dave Misir
(74) *Attorney, Agent, or Firm* — Perkins Coie LLP

(57) ABSTRACT

Systems and methods for selecting items of interest for an organization from a set of feeds, based on the interests that users have demonstrated through their interactions with existing content, are described herein. In some embodiments, the system is part of a content management service that allows users to add and organize files, media, links, and other information. The content can be uploaded from a computer, imported from cloud file systems, added via links, or pulled from various kinds of feeds.

23 Claims, 4 Drawing Sheets

(56) References Cited

U.S. PATENT DOCUMENTS

| | | |
|---|---|---|
| 2006/0129538 A1 | 6/2006 | Baader et al. |
| 2006/0248045 A1 | 11/2006 | Toledano et al. |
| 2007/0033517 A1 | 2/2007 | O'Shaughnessy et al. |
| 2007/0079384 A1 | 4/2007 | Grinstein et al. |
| 2007/0088820 A1 | 4/2007 | Kwak et al. |
| 2007/0150515 A1 | 6/2007 | Brave et al. |
| 2008/0154873 A1 | 6/2008 | Redlich et al. |
| 2008/0306954 A1 | 12/2008 | Hornqvist |
| 2009/0019026 A1 | 1/2009 | Valdes-Perez et al. |
| 2009/0106697 A1 | 4/2009 | Ward et al. |
| 2009/0164431 A1 | 6/2009 | Zivkovic et al. |
| 2009/0178144 A1 | 7/2009 | Redlich et al. |
| 2009/0222551 A1 | 9/2009 | Neely et al. |
| 2010/0070488 A1 | 3/2010 | Sylvain |
| 2010/0082622 A1 | 4/2010 | Irie et al. |
| 2010/0146593 A1 | 6/2010 | Stahl et al. |
| 2010/0198869 A1 | 8/2010 | Kalaboukis et al. |
| 2010/0235351 A1 | 9/2010 | Iwasa et al. |
| 2010/0250556 A1 | 9/2010 | Park et al. |
| 2010/0281389 A1 | 11/2010 | Hutchinson et al. |
| 2011/0023875 A1 | 2/2011 | Dasilva |
| 2011/0107260 A1 | 5/2011 | Park et al. |
| 2011/0191679 A1 | 8/2011 | Lin et al. |
| 2011/0225153 A1 | 9/2011 | Haseyama et al. |
| 2011/0238754 A1 | 9/2011 | Dasilva et al. |
| 2011/0251875 A1 | 10/2011 | Cosman |
| 2012/0001919 A1 | 1/2012 | Lumer |
| 2012/0066645 A1 | 3/2012 | Laurie et al. |
| 2012/0117475 A1 | 5/2012 | Lee et al. |
| 2012/0131495 A1 | 5/2012 | Goossens et al. |
| 2012/0143859 A1 | 6/2012 | Lymperopoulos et al. |
| 2012/0143880 A1* | 6/2012 | Sweeney .......... G06F 17/30867 707/749 |
| 2012/0158751 A1 | 6/2012 | Tseng et al. |
| 2012/0191715 A1* | 7/2012 | Ruffner .......... G06F 17/30011 707/738 |
| 2012/0197855 A1 | 8/2012 | Chen et al. |
| 2012/0271819 A1 | 10/2012 | Qiu et al. |
| 2012/0278329 A1 | 11/2012 | Borggaard et al. |
| 2012/0278761 A1 | 11/2012 | John |
| 2012/0290565 A1 | 11/2012 | Wana et al. |
| 2012/0290614 A1 | 11/2012 | Nandakumar et al. |
| 2012/0310926 A1 | 12/2012 | Gannu et al. |
| 2012/0313948 A1 | 12/2012 | Bergman et al. |
| 2013/0036114 A1 | 2/2013 | Wong et al. |
| 2013/0054583 A1 | 2/2013 | Macklem et al. |
| 2013/0110813 A1 | 5/2013 | Holm et al. |
| 2013/0124653 A1 | 5/2013 | Vick et al. |
| 2013/0218923 A1 | 8/2013 | Kaul et al. |
| 2013/0254280 A1 | 9/2013 | Yang et al. |
| 2013/0268479 A1 | 10/2013 | Andler et al. |
| 2013/0297582 A1* | 11/2013 | Zukovsky ......... G06F 17/30867 707/706 |
| 2013/0297590 A1* | 11/2013 | Zukovsky ......... G06F 17/30867 707/722 |
| 2013/0325858 A1* | 12/2013 | Xu .................... G06F 17/30867 707/730 |
| 2014/0006399 A1 | 1/2014 | Vasudevan et al. |
| 2014/0089048 A1 | 3/2014 | Bruich et al. |
| 2014/0089402 A1 | 3/2014 | Liyanage et al. |
| 2014/0189516 A1 | 7/2014 | Guo et al. |
| 2014/0359424 A1 | 12/2014 | Lin et al. |
| 2015/0177933 A1 | 6/2015 | Cueto |
| 2016/0042253 A1 | 2/2016 | Matei et al. |
| 2016/0162591 A1 | 6/2016 | Dokania et al. |

OTHER PUBLICATIONS

International Search Report and Written Opinion for International Application No. PCT/US2014/029505, dated Jul. 7, 2014, 11 pages.

Screenshot of Frequently Asked Questions page of Speaker Deck website. Taken Dec. 10, 2014 https://speakerdeck.com/faq#file_types.

Screenshot of main page of Speaker Deck website. Taken Dec. 10, 2014 https://speakerdeck.com/.

* cited by examiner

NEWS FEED

CROSS-REFERENCE TO RELATED APPLICATIONS

This application claims the benefit of U.S. Provisional Patent Application No. 62/037,956, filed on Aug. 15, 2014, entitled "NEWS FEED," which is herein incorporated by reference in its entirety. This application is related to U.S. Provisional Patent Application No. 61/800,497, filed on Mar. 15, 2013, entitled "INTEREST GRAPH-POWERED SHARING," U.S. Provisional Patent Application No. 61/745,365 filed on Dec. 21, 2012, entitled "INTEREST GRAPH-POWERED SEARCH," U.S. patent application Ser. No. 14/136,322 filed on Dec. 20, 2013, entitled "INTEREST GRAPH-POWERED SEARCH," U.S. Provisional Patent Application No. 61/800,322, filed on Mar. 15, 2013, entitled "INTEREST GRAPH-POWERED BROWSING", U.S. Provisional Patent Application No. 61/800,042, filed on Mar. 15, 2013, entitled "INTEREST GRAPH-POWERED FEED," U.S. Provisional Patent Application No. 61/914,266, filed on Dec. 10, 2013, entitled "SKIM PREVIEW," U.S. Provisional Patent Application No. 61/953,258, filed on Mar. 14, 2014, entitled "NARROWING INFORMATION SEARCH RESULTS FOR PRESENTATION TO A USER," U.S. patent application Ser. No. 14/213,505, filed on Mar. 14, 2014, entitled "INTEREST GRAPH-POWERED BROWSING," U.S. patent application Ser. No. 14/214,140, filed on Mar. 14, 2014, entitled "INTEREST GRAPH-POWERED FEED," and U.S. patent application Ser. No. 14/213,983, filed on Mar. 14. 2014, entitled "INTEREST GRAPH-POWERED SHARING," all of which are herein incorporated by reference in their entireties.

DETAILED DESCRIPTION

Figure 1:
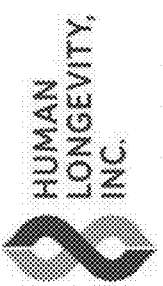
FIG. 1 is a display page showing how link previews can be displayed on a page that provides the ability to organize items into lists and groups of lists in accordance with some examples of the disclosed technology.

Systems and methods for selecting items of interest for an organization from a set of feeds, based on the interests that users have demonstrated through their interactions with existing content are described herein.

In some embodiments, the disclosed system is part of a content management service that allows users to add and organize files, media, links, and other information. The content can be uploaded from a computer, imported from cloud file systems, added via links, pulled from various kinds of feeds, and so on. For example, an RSS feed, or a news alert that repeatedly performs a search against a particular term, or any other source that produces a stream of content over time can be a feed.

The content management service organizes items of information into collections, called "spots." Users can preview and view items, copy them into other spots, search, comment, download, mail items, and the like. The system analyzes the activity that users have engaged in historically, looking at both items previously selected from feeds and at other kinds of content. From this data, the system develops classifiers that are used to select the most relevant items from the feeds and pull them into the service.

The classifiers are used to reject items of less relevance and to prioritize the ones that are most relevant. These highly relevant items are pulled into the system and presented to users. Classifiers are particularly important where a topic of interest has other common interpretations, for example, for users who want news about the company called "Box." The query "box" returns many articles that have no relevance to the company of that name (e.g., items about cardboard boxes, or office boxes, or the like). The classifier learns that only articles or other content about the company called "Box" are of interest, and filters out the others.

The disclosed system and methods include components for:
  Applying the disclosed techniques within a business or other kind of organization where the users have shared goals and a shared body of content,
  Collaborative training of a feed classifier. The actions of multiple users are combined to train a single classifier that chooses the most relevant items to pull from the feed. This is appropriate because the goals of individuals within an organization are often aligned.
  Creating multiple classifiers for an organization. For example, the sales team typically has different interests than the engineering team. However, there is also overlap as both might like to see news about the company as a whole. The approach described herein allows the system to maintain one classifier that pulls in articles about the whole company ("Company News") that everyone might be interested in, another for engineering information related to the company's activities ("Cellular Radio Engineering"), and so forth.
  Creating classifiers at various scopes. A classifier might apply to a particular topic (e.g., competitive news) and/or to a particular person (e.g., a personal news spot) or group (e.g., the sales team). One organization can have many classifiers: it can have one or more for every user and for every group. In some instances, it makes sense to have multiple classifiers for the same group because the group may be interested in different material in different contexts. For example, when the sales team visits a collection about competitors, the classifier that chooses the right content to pull in would be different than when the same group visits a collection about industry trends affecting its market.
  Applying signals gathered from various types of content to the choice of items from the feed. The content management service contains a variety of information, not just items from the feed. For example, the content management service might hold business documents and presentations, manually created links to web pages, email, and so forth. The classifier may be trained by leveraging all of that content to identify topics and material that users in the organization are most likely to be interested in.

Using implicit training signals. The system allows users to explicitly train the classifiers by voting on individual items, but that is optional. In some examples, a majority of the training is done by observing implicit feedback, such as document views, the forwarding of items to other users, comments, and other positive indicators of interest. Some operations (such as deleting an item) provide negative feedback.

User Experience

Viewing Feed Items

In some embodiments, the system applies the disclosed techniques to identify, for example, news items that are of interest to users of the content management service. These items are added to a spot automatically as they become available from one or more feeds and are determined by the classifier to be sufficiently relevant to the users of the spot. The system adds a link to the item, a description that is computed from the feed and from the contents of the item, and an available image.

The description may be explicitly provided within the feed (a feature that feed protocols like RSS support), it may be explicitly provided within the item contents (a feature that some item formats like HTML support), or it may be computed from the content. There are very simple ways to compute a summary from a body of content, such as taking the first paragraph of the content. There is also a wide variety of auto-summarization algorithms and techniques described in the literature; LexRank is a well-known example.

The system also chooses an image, where one is available. Some feed protocols like RSS allow the provider to specify an image for the item. Otherwise, the system looks in the body of the content to determine whether there are any images embedded in it. If so, it chooses the "best" one by applying a series of heuristics. For example, higher resolution images are better, earlier images are better, and images must be above a certain size threshold to be usable.

A spot that draws content from feeds looks and acts like any other collection of content. FIG. 1 is a display page 100 showing how link previews can be displayed on a page that provides the ability to organize items into lists and groups of lists. In the left column there is a set of "lists" 110 ("Data Analysis" and "Machine Learning" in this example) with each list representing a news feed or other source of articles. In this example, the sources include a query (e.g., "Machine Learning") that is run against the news section of a search engine and an RSS feed of information about Data Analysis.

On the right is a collection of items 120 that have been added recently from these feeds. Periodically a posting process is run, which collects news from all the specified news sources, and then scores each article using a classifier. Those articles that are above a "relevance threshold" are considered candidates for posting to the spot. Additionally, one can limit the number of articles posted to the spot or the number of articles from each feed source.

Creating Feeds

In some embodiments, a user creates a feed by specifying either a URL (e.g., for an RSS feed) or a term that is given to an external news search engine and that yields a stream of results over time that match or partially match the search term(s).

Figure 2:
FIG. 2 is a display page illustrating a training dialog for a feed in accordance with some examples of the disclosed technology.

FIG. 2 is a display page illustrating a training dialog 200 for a feed. When a user creates a new feed, for example, the system presents a training dialog, asking the user to vote up 210 or down 220 on several of the items. These votes serve to calibrate or initialize the classification engine.

Advanced Training

In some embodiments, sophisticated users who are willing to give additional training input may use a more complex tool that allows many items to be voted on and the results of those votes to be seen.

Figure 3:
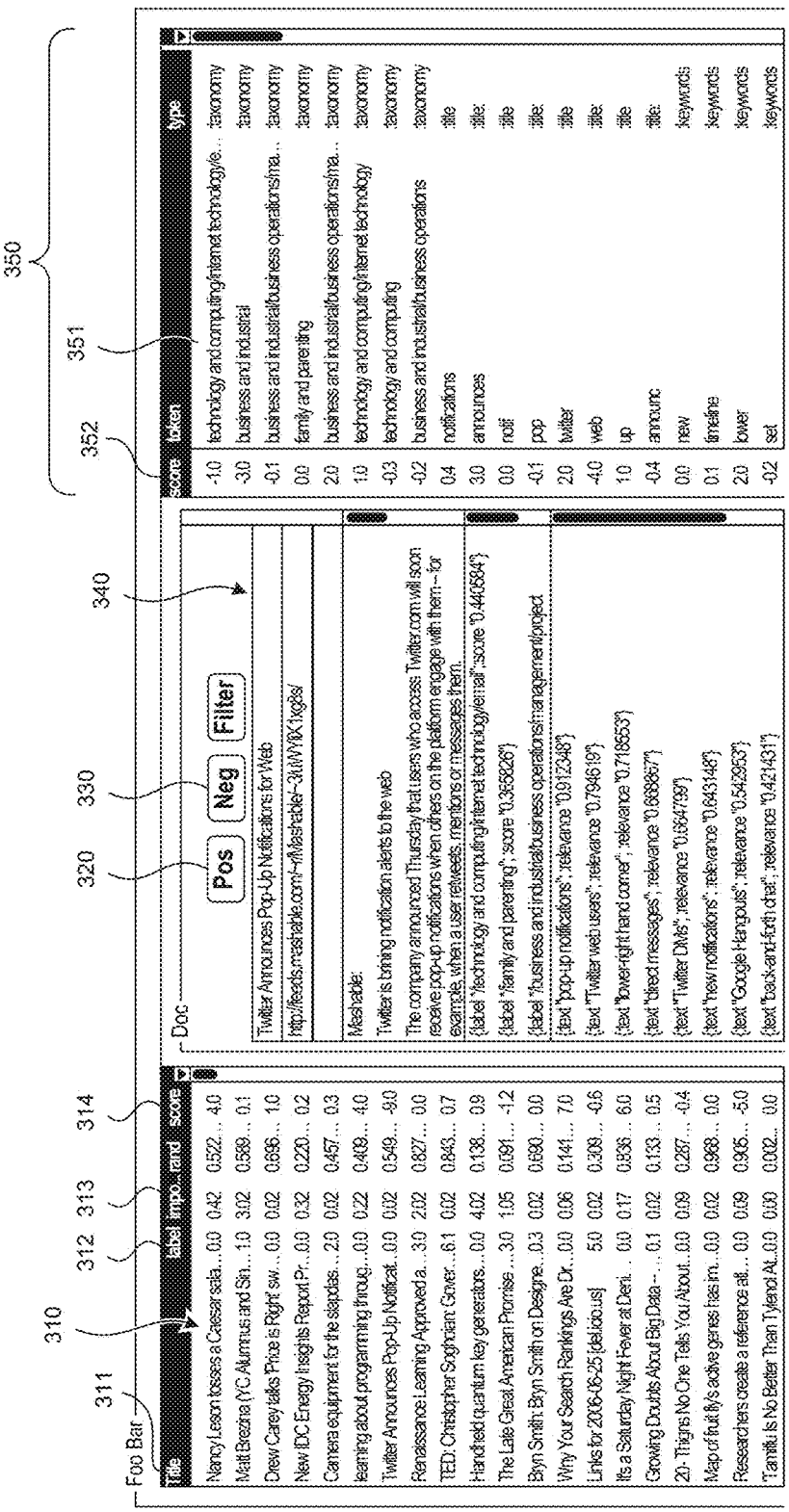
FIG. 3 is a display page illustrating a tool that allows many items to be voted on and shows the results of those votes in accordance with some examples of the disclosed technology.

FIG. 3 is a display page illustrating a tool that allows many items to be voted on and shows the results of those votes. In this example, on the left is a scrollable list 310 of example articles that shows the title 311, followed by the label 312, importance 313, and currently estimated score 314. In this column 310 a user can select and multiselect example items, which can then be labeled using the buttons at the top center to provide positive ("Pos") 320 or negative ("Neg") 330 input to the training algorithm.

In the center column 340 are the raw data associated with the selected item (such as the title, URL, summary, and so forth). Column 340 also includes keywords and categories that have been computed from the content of the item.

The right column 350 indicates how the selected example is scored and includes a list of features 351 and the score 352 associated with each feature (positive or negative).

This advanced tool is useful for users who are very familiar with classification and wish to adjust the ranking in detail. It is also an opportunity to "fix" problems with the way that implicit signals have trained the classifier.

Implementation

In some embodiments, the system comprises:
an ingestion engine that finds new items, applies classifiers to them, and pulls in items of high relevance,
a training system that builds classifiers to rank new items, and
a set of user signals that are gathered by the content management service as users interact with the items that were pulled in.

Ingestion Engine

Retrieve Content

The ingestion engine periodically checks all the feeds for new content and analyzes new items that become available. Each item is pulled in and passed through a classifier to assign it a ranking. If the item is above a certain threshold, it is added to the collection.

Note that the ranking can be adjusted based on the amount of material available, if desired. The system optionally places an upper limit on the total number of items (e.g., 5, 10, 100, 1000) that can be added to a collection for a given period (e.g., minute, hour, day, week, month). For a news spot that is visited by users periodically, it is often appropriate to set a limit on the order of a few items per hour. Too few items, and users may be starved for new items and can lose interest in the spot; too many, and they may be overwhelmed. It is common for there to be many, many more candidate items than the number actually displayed, for example, thousands of candidates per day that need to be winnowed down to just a handful.

The items in the feed contain a variety of information, such as a title, a URL, one or more images, and/or a summary. The feed might contain the whole item or might have a URL that points to it. The URL endpoint could be a web page or a resource like an image, document, PDF file, video, or the like. The ingestion engine pulls in the content from the feed and, if applicable, the full item from the URL.

Note that in some examples the ingestion engine stores the content that it fetches for a window of time (e.g., one hour, one day, one week, one year), allowing it to efficiently serve multiple organizations because often the same feeds/queries are of interest to multiple teams across multiple organizations. The fetching and parsing of the items is done once and the cost amortized across the different consumers.

Process Content

In some embodiments, the body of each item is processed to identify the most relevant content keywords, stripping out formatting, HTML commands, and the like. The resulting content is then processed into unigrams and bigrams (or tokens). These are passed into each relevant classifier, which computes a ranking per item. This is done using a training software package (e.g., any version of Vowpal Wabbit (or "VW") supported by Microsoft Research, which supports training and scoring documents using a "bag of words" model). Items that score above the threshold defined for each classifier can be added to the associated collection in the content management service.

Training System

The system periodically (e.g., once per minute, hour, day, week, month) kicks off the training process to update each classifier. When the training system is invoked for the first time, before any feed content activity is available, the system uses activity that a target user population has engaged in against other content. For users may have manually posted links to web pages that generated some level of activity (views, likes, comments, shares, respots, downloads, etc.). These example activities are all considered positive (relevant), and the weight of their positive value is determined by the amount or extent of activity (e.g., number and/or duration of views, number of likes, number of comments, clout, influence, or reputation of the user(s) performing each activity). For example, users who forward information items to other users who, in turn, provide some positive form of feedback to those information items may be deemed to have more influence or a greater reputation than users who forward items that receive no feedback or negative feedback. Similarly, uses who have a lot of "friends" or "followers" may be deemed to have more influence or a greater reputation than users with fewer "friends" or "followers." The training data may also include the initial training "votes" that were cast when the feed was created (as described above).

On subsequent invocations, the classifier incorporates new activity that has happened to posted items since the last training run. In some embodiments, the classifier is also updated against items that were not posted, with a negative ranking. This is important because otherwise the ranking becomes less accurate when the classifier gets more and more accurate. Trying to distinguish relevant from irrelevant documents using only relevant documents is like trying to distinguish pictures of dogs from cats, using only pictures of dogs.

The measure of relevance of an item is based on the amount of engagement that the item triggers among the user population in views, likes, comments, shares, respots, downloads, etc. The system tries to predict which examples will get engagement and chooses those to put in the feed.

In some examples, new items that were added automatically start out with a mildly negative rating because the goal is to generate user activity, and having no user activity is considered a failure. The item is being presented to users, so a lack of interest is a negative. However, lack of activity does not ensure that an item is of poor relevance-it might simply have been overlooked. Any meaningful level of positive engagement can move the item to positive, and the more activity, the higher the weight.

User Signals

As the multiple users of a spot read information items, save copies (known as a respot), or forward information items to others, the system collects the information including an indication of the information item and an indication of the activity. Information items that get a lot of activity are considered relevant. Those that are deleted are considered irrelevant, and those that get no activity are considered mildly irrelevant.

Metrics

There are a variety of metrics that can be used to track the behavior of the system.

Operational metrics measure whether the system is running correctly:
Number of feeds.
Number of spots.
Number of entries per feed/spot that were crawled/fetched.
Number of entries posted per feed/spot (same feed could be in different spots, so the number is a function of the feed classifier and feed type).

User metrics measure the level of user engagement:
Number of news spot visits.
Number of unique users that visited a news spot.
Number of actions/views on news items.
Number of item impressions (and therefore the click-through rate).
Average position of the clicks on news spots.

Elaborations

Diversity

One challenge is that feeds often have radically different amounts of content. A popular search term or an extremely active forum (e.g., Reddit or Hacker News) can have thousands of articles per day. A high-quality blog from an industry leader might have one posting a week, but would be of great interest to the users.

This variability causes two problems:
The "noisy" feed can so dominate that no articles from the other feeds are ever shown, so they never get the opportunity to "show their worth." The classifier never learns that users greatly value the postings from the low-traffic feeds, and the dominance of the noisy forum becomes self-reinforcing. All the user activity says that the postings are interesting, so more and more of them appear, until they completely dominate the postings.
The diversity of postings can get lost. Even if they are most likely to click on items from the noisy feed, users still like to see some items from the other feeds.

The disclosed system addresses these problems by:
Enforcing diversity over a time period, so no single source can completely dominate.
Penalizing articles that are from the same source as ones that have been recently posted. This reduces the dominance of the one feed temporarily and allows articles from other sources to get through.
Artificially boosting articles from new sources for a period of time, so that they will get a chance to get some articles into the feed that can be measured against user interest.

Auto-Personalization

In some embodiments, the system achieves an extreme level of personalization by building a classifier for every user. In some embodiments, the disclosed system creates an automatic news spot for everyone, using an individual's historical activity as a training set.

Testing the Algorithm

Different posting algorithms can be tested by recording all the scores ever computed for all the items from every feed. Then the system can "go back in time" and evaluate alternative posting algorithms against the engagement statistics to identify improvements to the ranking algorithm.

Handling High Relevance

One challenge is when the relevance algorithm causes all or most of the items being displayed to be highly relevant. In these examples, users will engage more with some items than with other items, but they are all relevant and should all have been shown. In these cases, a lack of activity is no longer a good measure of lower relevance. Using the normal model of training, the algorithm would "learn" that highly relevant items were wrong to display, and its quality will degrade as it second-guesses its (valid) decisions. As mentioned above, one way to address this is to include the unposted articles in the training set. Another way to address this is to include some low-quality items in the postings, but that can have the negative side effect of wasting user time looking at items that are not highly relevant.

System

Figure 4:
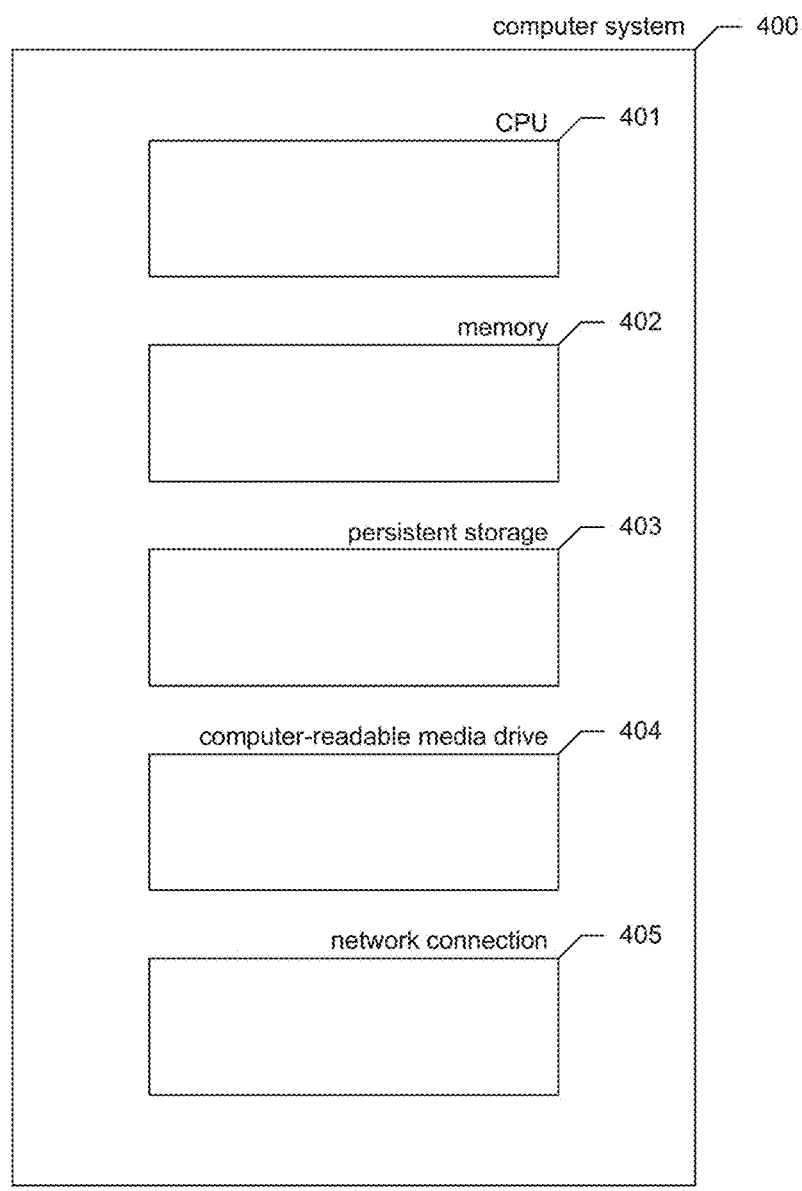
FIG. 4 is a block diagram illustrating some of the components that may be incorporated in at least some of the computer systems and other devices on which the system operates and interacts with in accordance with some examples of the disclosed technology.

FIG. 4 is a block diagram illustrating some of the components that may be incorporated in at least some of the computer systems and other devices on which the system operates and interacts with in some examples in various examples, these computer systems and other devices 400 can include server computer systems, desktop computer systems, laptop computer systems, netbooks, tablets, mobile personal digital assistants, televisions, cameras, automobile computers, electronic media players, and/or the like. In various examples, the computer systems and devices include one or more of each of the following: a central processing unit ("CPU") 401 configured to execute computer programs; a computer memory 402 configured to store programs and data while they are being used, including a multithreaded program being tested, a debugger, the facility, an operating system including a kernel, and device drivers; a persistent storage device 403, such as a hard drive or flash drive configured to persistently store programs and data; a computer-readable storage media drive 404, such as a floppy, flash, CD-ROM, or DVD drive, configured to read programs and data stored on a computer-readable storage medium, such as a floppy disk, flash memory device, a CD-ROM, a DVD; and a network connection 405 configured to connect the computer system to other computer systems to send and/or receive data, such as via the Internet, a local area network, a wide area network, a point-to-point dial-up connection, a cell phone network, or another network and its networking hardware in various examples including routers, switches, and various types of transmitters, receivers, or computer-readable transmission media. While computer systems configured as described above may be used to support the operation of the facility, those skilled in the art will readily appreciate that the facility may be implemented using devices of various types and configurations, and having various components. Elements of the facility may be described in the general context of computer-executable instructions, such as program modules, executed by one or more computers or other devices. Generally, program modules include routines, programs, objects, components, data structures, and/or the like configured to perform particular tasks or implement particular abstract data types and may be encrypted. Moreover, the functionality of the program modules may be combined or distributed as desired in various examples. Moreover, display pages may be implemented in any of various ways, such as in C++ or as web pages in XML (Extensible Markup Language), HTML (HyperText Markup Language), JavaScript, AJAX (Asynchronous JavaScript and XML) techniques or any other scripts or methods of creating displayable data, such as the Wireless Access Protocol ("WAP").

The following discussion provides a brief, general description of a suitable computing environment in which the invention can be implemented. Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. In some cases, various steps in the algorithms discussed herein may be added, altered, or removed without departing from the disclosed subject matter. Those skilled in the art will appreciate that features described above may be altered in a variety of ways. For example, the order of the logic may be rearranged, sublogic may be performed in parallel, illustrated logic may be omitted, other logic may be included, etc.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function dam, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

The invention claimed is:

1. A computer-implemented method of identifying information of interest within an organization, the method comprising:
   determining use data that characterizes relationships among a plurality of information items;
   for a plurality of users associated with the organization, training at least one classifier based on the plurality of users associated with the organization, wherein the training comprises:
      selecting a proper subset of the plurality of information items;
      for each of the selected information items,
         receiving, from a specific user associated with the organization, feedback indicating at least one preference of the specific user related to the selected information item, and
         for each of a plurality of tokens associated with the selected information item,
            attributing a score to the token based at least in part on the received feedback, and
            storing the attributed score;
   receiving an indication of a first group of two or more information items within the organization, wherein the first group of two or more information items within the organization includes at least two information items not included in the selected proper subset of the plurality of information items; and
   for each of a plurality of information items of the first group of two or more information items within the organization,
      for each of the specific user of the plurality of users associated with the organization,
         accessing the at least one trained classifier that has been trained using feedback received from the specific user;
         determining whether the specific user is likely to find the information item interesting based at least in part on the accessed at least one trained classifier, and
         providing, for display, an indication of at least one information item of the first group of two or more information items within the organization that the specific user is likely to find interesting.

2. The method of claim 1, wherein the information items include user data and collections of information items.

3. The method of claim 2, wherein the organization includes a structured body of users with associated roles within the organization and who have access to the information items within the organization.

4. The method of claim 1, wherein determining whether a first user is likely to find a first information item interesting comprises:
identifying a plurality of tokens associated with the first information item,
for each of the identified plurality of tokens associated with the first information item, attributing a score to the identified token based on the at least one trained classifier; and
determining a score for the first information item based at least in part on the scores attributed to the identified plurality of tokens.

5. The method of claim 4, further comprising:
determining whether the determined score for the first information item exceeds a first predetermined threshold.

6. The method of claim 4, wherein the plurality of identified tokens include at least one keyword associated with the first information item, at least one category associated with the first information item, at least one title word associated with the first information item, and at least one word in the body of the first information item.

7. The method of claim 1, further comprising:
collaboratively training the at least one classifier for a first plurality of users associated with the organization, wherein the training comprises:
selecting the proper subset of the plurality of information items;
for each of the selected information items,
receiving, from each of the first plurality of users associated with the organization, feedback related to the selected information item,
for each of the plurality of tokens of the selected information item,
attributing the score to the token based at least in part on:
the received feedback from each of the first plurality of users associated with the organization, and
the reputation and influence of each of the first plurality of users associated with the organization.

8. The method of claim 1, wherein the received feedback is implicit feedback.

9. The method of claim 8, wherein the received implicit feedback includes at least one document view associated with an information item.

10. The method of claim 9, wherein the received implicit feedback includes at least one information item being forwarded to other users and at least one comment associated with the at least one information item.

11. The method of claim 8, wherein the received implicit feedback includes at least one form of negative feedback.

12. The method of claim 11, wherein the negative feedback includes deleting an information item.

13. The method of claim 1, wherein the received feedback is explicit feedback.

14. The method of claim 1, wherein a provided indication of a first information item of the first group of two or more information items within the organization that the specific user is likely to find interesting includes a first image selected from among a plurality of images associated with the first information item.

15. The method of claim 14, wherein selecting the first image comprises:
for each of the plurality of images associated with the first information item, determining a resolution of the image; and
selecting the image with the highest resolution from among the plurality of images associated with the first information item.

16. The method of claim 14, wherein selecting the first image comprises:
for each of the plurality of images associated with the first information item, determining a size of the image; and
selecting the image with the highest determined size from among the plurality of images associated with the first information item.

17. The method of claim 14, wherein selecting the first image comprises:
for each of the plurality of images associated with the first information item, determining a date and time of the image; and
selecting the image with the earliest determined date and time from among the plurality of images associated with the first information item.

18. A non-transitory computer-readable medium storing instructions that, if executed by a computing system having a processor, cause the computing system to perform a method for identifying information of interest within an organization, the method comprising:
determining use data that characterizes relationships among a plurality of information items;
for a plurality of users associated with the organization,
training at least one classifier based on the plurality of users associated with the organization, wherein the training comprises:
selecting a proper subset of the plurality of information items;
for each of the selected information items,
receiving, from a specific user associated with the organization, feedback indicating at least one preference of the specific user related to the selected information item, and
for each of a plurality of tokens associated with the selected information item,
attributing a score to the token based at least in part on the received feedback, and
storing the attributed score;
receiving an indication of a first group of two or more information items within the organization, wherein the first group of two or more information items within the organization includes at least two information items not included in the selected proper subset of the plurality of information items; and
for each of a plurality of information items of the first group of two or more information items within the organization,
for each of the specific user of the plurality of users associated with the organization,
accessing the at least one trained classifier that has been trained using feedback received from the specific user;
determining whether the specific user is likely to find the information item interesting based at least in part on the accessed at least one trained classifier, and
providing, for display, an indication of at least one information item of the first group of two or more information items within the organization that the specific user is likely to find interesting.

19. The non-transitory computer-readable medium of claim 18, the training further comprising:
for each of the selected information items,
for each of a plurality of features of the selected information item,
attributing a score to the feature based on feedback from at least one user.

20. The non-transitory computer-readable medium of claim 19, wherein determining whether the specific user is likely to find the information item interesting based at least in part on the at least one trained classifier comprises:
applying the at least one trained classifier to features of the information item.

21. A computing system, having one or more processors, comprising:
at least one of the one or more processors configured to determine use data that characterizes relationships among a plurality of information items;
at least one of the one or more processors configured to, for a plurality of users associated with the organization, train at least one classifier based on the plurality of users associated with the organization, wherein the training comprises:
selecting a proper subset of the plurality of information items;
for each of the selected information items,
receiving, from a specific user associated with the organization, feedback indicating at least one preference of the specific user related to the selected information item, and
for each of a plurality of tokens associated with the selected information item,
attributing a score to the token based at least in part on the received feedback, and
storing the attributed score;
at least one of the one or more processors configured to receive an indication of a first group of two or more information items within the organization, wherein the first group of two or more information items within the organization include at least two information items not included in the selected proper subset of the plurality of information items; and
at least one of the one or more processors configured to, for each of a plurality of information items of the first group of two or more information items within the organization,
for each of the specific user of the plurality of users associated with the organization,
accessing the at least one trained classifier that has been trained using feedback received from the specific user,
determine whether the specific user is likely to find the information item interesting based at least in part on the at least one trained classifier, and
provide, for display, an indication of at least one information item of the first group of two or more information items within the organization that the specific user is likely to find interesting.

22. The computing system of claim 21, further comprising:
at least one of the one or more processors configured to periodically identify newly available information items; and
at least one of the one or more processors configured to, for each of the identified newly-available information items,
for each of the plurality of users,
applying the at least one trained classifier associated with the specific user to attributes of the newly-available information item to determine a relevance value,
determining that the determined relevance value exceeds a predetermined threshold, and
in response to determining that the determined relevance value exceeds the predetermined threshold, adding the newly-available information item to a collection of items associated with the specific user.

23. The computing system of claim 21, further comprising:
at least one of the one or more processors configured to, for a first information item,
determine a number of views of the first information item,
determine a duration of views of the first information item,
determine a number of likes of the first information item, and
determine a number of comments on the first information item.

* * * * *